United States Patent [19]

White

[11] 4,234,706

[45] * Nov. 18, 1980

[54] QUINONE-COUPLED POLYPHENYLENE OXIDES

[75] Inventor: Dwain M. White, Schenectady, N.Y.

[73] Assignee: General Electric Company, Schenectady, N.Y.

[*] Notice: The portion of the term of this patent subsequent to Feb. 20, 1996, has been disclaimed.

[21] Appl. No.: 800,635

[22] Filed: May 26, 1977

[51] Int. Cl.³ .................... C08G 65/44; C08G 65/48
[52] U.S. Cl. .................................. 525/390; 528/125; 528/126; 528/212; 528/218; 260/396 R
[58] Field of Search ............... 260/47 CT, 396 R, 61, 260/50; 210/874; 528/125, 126, 212, 218; 525/390

[56] References Cited

U.S. PATENT DOCUMENTS

| | | | |
|---|---|---|---|
| 3,290,386 | 12/1966 | Stamatoff | 260/613 |
| 3,375,228 | 3/1968 | Holoch et al. | 260/47 |
| 3,440,290 | 4/1969 | Widiger | 260/613 |
| 3,573,254 | 3/1971 | Factor | 260/47 |
| 3,736,291 | 5/1973 | Vogel | 260/47 R |
| 3,784,575 | 1/1974 | Rutledge | 260/396 R |
| 3,970,640 | 7/1976 | Yonemitsu et al. | 260/47 ET |
| 3,987,068 | 10/1976 | Reilly | 260/396 R |

*Primary Examiner*—Lester L. Lee
*Attorney, Agent, or Firm*—F. Wesley Turner; Joseph T. Cohen; James C. Davis, Jr.

[57] ABSTRACT

Quinones and polyphenylene oxides are reacted to provide quinone-coupled polyphenylene oxides having an average hydroxyl group per molecule value greater than the average hydroxyl group value associated with polyphenylene oxide reactants. The resulting new polymers have improved color and in combination with styrene resins provide thermoplastic compositions having improved chemical and physical properties.

8 Claims, No Drawings

QUINONE-COUPLED POLYPHENYLENE OXIDES

CROSS REFERENCE TO RELATED APPLICATIONS

This invention is related to subject matter disclosed in my copending U.S. applications Ser. Nos. 800,641 800,656, and 800,644, all filed on May 26, 1977. All of the aforesaid applications are also my inventions and are assigned to the same assignee as the assignee of this application. All of the disclosures referenced above are incorporated herein in their entirety by reference.

BACKGROUND OF THE INVENTION

1. Field of the Invention

This invention relates to quinone-coupled polyphenylene oxides having an average hydroxyl group per molecule value greater than the average hydroxyl group value associated with polyphenylene oxide reactants employed in the reaction with quinones.

2. Description of the Prior Art

Self-condensation reactions of certain phenols employing oxygen in combination with an effective oxidative coupling catalyst system to form prior art polyphenylene oxides, i.e., polyphenylene oxides having an average hydroxyl group per molecule of 1.0 or less, are described in various U.S. patent applications including Hay's U.S. Pat. Nos. 3,306,879; 3,914,266; application Ser. No. 540,473, filed Jan. 13, 1975, now U.S. Pat. No. 4,028,341 a continuation-in-part of Ser. No. 441,295, filed Feb. 11, 1974, now abandoned; and Olander's U.S. Pat. Nos. 3,956,442; 3,965,069; 3,972,851; and Ser. No. 582,910, filed June 2, 1975, now U.S. Pat. No. 4,054,553. All of the Hay and Olander disclosures referenced above are incorporated herein in their entirety by reference.

Cooper's U.S. Pat. No. 3,496,236 discloses the equilibration of polyphenylene oxide and certain phenols in the presence of phenoxy radical carried out under oxidizing reacting conditions. My U.S. Pat. No. 3,367,978 discloses the preparation of novel compositions of matter resulting from the reaction of a phenol and a polyphenylene oxide under equilibration reaction conditions, i.e., carried out under oxidizing reaction conditions. All of the Cooper and my disclosures referenced above are incorporated herein in their entirety by reference.

Heretofore, quinone reaction product species known to be most deleterious to the color of polyphenylene oxides have been separated therefrom by precipitating the polymer from a solvent system in which the quinone species are soluble. Heretofore, multiple solvent precipitation and/or extraction techniques have been employed to remove significant amounts of quinone, e.g., up to one percent of quinone based on the weight of polymers, prior to isolation of prior art polyphenylene oxides as a solid reaction product suited to further processing to form a suitable commercial end product.

Unexpectedly and advantageously I have found that quinones can be reacted with polyphenylene oxides to form novel quinone-coupled polyphenylene oxides having an average hydroxyl group value greater than the hydroxyl group value associated with the polyphenylene oxide reactants. The resulting quinone-coupled polyphenylene oxides are new compositions of matter substantially free of quinone color entities, which are suited to the manufacture of thermoplastic compositions having improved chemical and physical properties.

DESCRIPTION OF THE INVENTION

This invention embodies new quinone-coupled polyphenylene oxides having an average hydroxyl group per molecule value greater than the average hydroxyl group value associated with the polyphenylene oxide reactant.

Broadly, a presently preferred quinone-coupled polyphenylene oxides are illustrated by the formula:

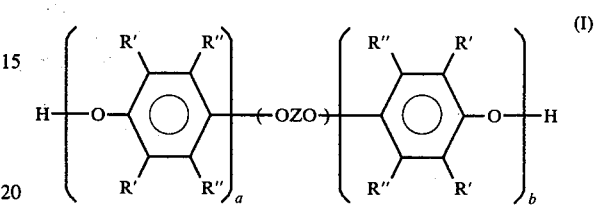

wherein independently each ─OZO─ is a divalent quinone residue, Z is a divalent arene radical, either a or b is at least equal to 1, the sum of a plus b is preferably at least equal to 10, and more preferably 40 to 500, even more preferably 125 to 250, R' is hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus, R" being the same as R' and, in addition, halogen. A presently preferred quinone-coupled polyphenylene oxide is of formula (I) above wherein independently each R' is hydrogen, a hydrocarbon radical, a halohydrocarbon radical, and even more preferably is a methyl radical, R" being hydrogen.

Representative of the classes of substituents, such as R' and R" which can be associated with a quinone-coupled polyphenylene oxide of formula (I) above are any of the substituents associated and positioned in analogous locations relative to the hydroxyl group of any of the phenol reactants described by Hay and Olander in their U.S. patents and applications referred to hereinbefore. Accordingly, the descriptions of representative substituents as described by Hay and Olander as set out in the aforesaid patents and applications are hereby incorporated herein in their entirety by reference.

Broadly, the quinone-coupled polyphenylene oxides can be prepared by reacting polyphenylene oxides containing quinones under any reaction conditions, e.g., time, temperature and pressure, which facilitates reaction of at least a portion, and preferably all of any quinone species of polyphenylene oxides, subject to the proviso that the reaction is carried out in a reaction medium substantially free of (1) any monophenol reactant and (2) any active oxidative coupling catalyst system known to those skilled in the art which promotes self-condensation of monophenols to form polyphenylene oxides.

Accordingly, any prior art quinone containing polyphenylene oxide reaction product can be employed including, illustratively, those of Hay and Olander referred to herein, subject to the proviso that the reaction products be separated from substantially all of the active catalyst system as well as substantially all of any unreacted phenol prior to reacting the quinone with the polyphenylene oxide. Separation of the active catalyst system from the Hay and Olander prepared prior art polyphenylene oxides can be carried out by any means, e.g., by purging oxygen from the reaction medium via inert gas displacement by argon, nitrogen, etc., whereby substantially all of the oxygen or air employed in the oxidative coupling process is separated from the polymer; by centrifuging the reaction products whereby substantially all of any copper or manganese component of the active catalyst system and/or any unreacted monophenol contained within the aqueous phase reaction products is separated from the organic phase which comprises substantially all of the polyphenylene oxide and quinone plus minor amounts of any primary, secondary or tertiary amines employed in the prior art catalytic processes.

The organic phase as separated from the oxidative coupling catalyst system and phenol reactant can be employed without further refinement. In the reaction of quinone with polyphenylene oxide, substantially all of the quinone entrained by the polyphenylene oxide reaction products is integrated into the polymer backbone in a nonextractable form. Not limiting my invention to any theory, I believe that the quinone entities are coupled with individual polymer entities in accordance with the following postulated theoretical reaction mechanism:

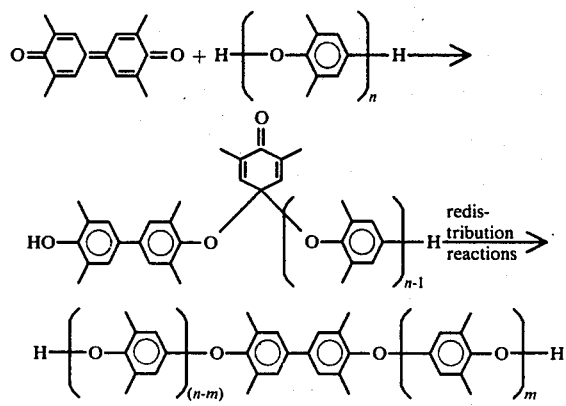

where
n = number average degree of polymerization and
m = 0, 1, 2, 3, ... etc.

In general, any reaction temperature can be employed. Presently, temperatures of from 0° C. to 150° C. or even higher, preferably 50° C. to 100° C. are used. In a preferred embodiment of this invention, the quinone containing polyphenylene oxide is prepared in accordance with Hay's process described in U.S. application Ser. No. 540,473, employing the hydrolytically stable catalyst system described in Hay's U.S. Pat. No. 3,914,266, since the quinone containing polyphenylene oxide reaction products associated with the aforementioned process after separation from the oxidative coupling catalyst system can be reacted with the quinone at elevated temperatures, e.g., in excess of 50° C. without deleteriously affecting the intrinsic viscosity of the quinone-coupled polyphenylene oxides, i.e. without decreasing by 10–50% the value of the intrinsic viscosity associated with polyphenylene oxide charged to the reaction medium.

Any polyphenylene oxide can be employed regardless of intrinsic viscosity or the amount of quinone contained within the polyphenylene oxide charged to the reaction medium prepared according to any of the prior art method of Hay or Olander.

Broadly, the polyphenylene oxides of Hay and Olander that can be employed are illustrated by the formula

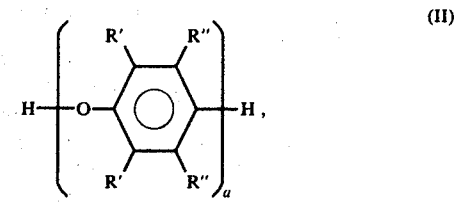

(II)

wherein independently each a is at least equal to 10, preferably 40 to 170, R', R" are as defined hereinbefore with respect to formula (I).

Preferably, the polyphenylene oxides employed in the quinone-coupling reaction is a polyphenylene oxide which contains quinone limited to 1% or less by weight based on the weight of polymer and more preferably contains less than 1% by weight of quinone as well as less than 2% and more preferably less than 1½% by weight of any primary or secondary or tertiary amine.

Polymers prepared herein having enhanced hydroxyl content and being free of known species which are deleterious to polymer color characteristics can be advantageously coupled and/or capped as described in my related U.S. Pat. No. 4,156,770 issued May 29, 1979 and U.S. Pat. No. 4,165,422 issued Aug. 21, 1979 to further enhance their molecular weight and/or color stability, respectively. The resulting quinone-coupled polyphenylene oxide polymer reaction products can be employed in conjunction with other polymers such as high impact polystyrene, etc., prepared polymer blends as taught by Cizek in U.S. Pat. No. 3,383,435 in the preparation of polyphenylene oxide resin combinations well known to those skilled in the art as Noryl ® resins "Encyclopedia of Polymer Science and Technology", entitled *Phenols, Oxidative Polymerization*, Vol. 10, published by Interscience Publishers (1969).

EXAMPLE I

(A) Polymer Preparation

A 2.5 gallon stainless steel polymerization reactor equipped with stirrer, heating and cooling coils, thermocouples, monomer inlet tube, oxygen/nitrogen inlet tube, reflux condenser and an external circulation loop with pressure gauge to monitor viscosity was charged with 5.18 l. toluene, 255.9 g. N,N-dibutylamine, 67.2 g. methanol, 6.64 g. cupric chloride, 10.17 g. sodium bromide and 1.5 g. Aliquat ® 336, i.e. tricaprylylmethylammonium chloride. Oxygen was bubbled through the stirred mixture and 1600 g. 2,6-xylenol, also known as 2,6-dimethylphenol, dissolved in 1800 ml. toluene was added over a 40 minute period. The initial heat of reaction brought the temperature up to 40° C. which temperature was maintained during the course of the reaction.

(B) Catalyst Deactivation

After a total reaction time of 85 minutes, the oxygen flow was replaced with nitrogen and 69.5 g. of an aqueous 38% trisodium EDTA solution was added. Analysis of the reaction mixture showed a poly(2,6-dimethyl-1,4-phenylene oxide) having an intrinsic viscosity [η] equal to 0.62 dl./g. as measured in chloroform as 25° C., and a hydroxyl end group infrared absorption at 3610 cm.$^{-1}$ of 0.043 units based on a 2.5% solution in CS$_2$ over a 1 cm. path calibrated against CS$_2$ in a matched cell. Spectrophotometric analysis of the reaction mixture (diluted with benzene and measured over a 1 cm. path at 422 nm.) showed 1% by weight of 2,6-xylenol had been converted to 3,3',5,5'-tetramethyl-1,4-diphenoquinone (TMDQ).

(C) Quinone Coupling (1) The TMDQ containing reaction mixture during a two hour period was diluted with toluene to a 10% solids level, heated at 50° C., washed with an equal volume of water and passed through a Westphalia liquid-liquid centrifuge to remove the aqueous phase which contained copper salts and a portion of the amine. Methanol (2.5 volumes) was added to half of the centrifuged reaction mixture to precipitate the polymer. The polymer was collected on a filter, washed with methanol and dried in a circulating air oven at 80° C. Polymer analysis showed: [η] equal to 0.55 dl./g., an OH absorbance of 0.090 units, a nitrogen content of 1051 ppm, and a TMDQ content of less than 0.01% by weight based on the weight of 2,6-xylenol TMDQ.

(2) The remaining half of the TMDQ containing mixture was precipitated by spraying with steam through a nozzle into water at 95° C. at a rate sufficient to provide rapid azeotropic removal of toluene and other volatiles, such as amines and methanol. The steam precipitated solid polymer was collected on a filter, washed with additional water and dried at 90° C. in a circulating air oven. Polymer analysis showed a yellow pelletized material, an [η] equal to 0.55 dl./g., a OH absorbance of 0.25 units, a nitrogen content of 1136 ppm, and a TMDQ content of 0.1% based on the weight of 2,6-xylenol.

A summary of polymer processing and results is set out in Table I.

TABLE I

| | Process Step(s) | Reaction Temp. °C. | [η] dl./g. | OH Absorbance @ 2610 cm.$^{-1}$ |
|---|---|---|---|---|
| (A) | Polymer Preparation, plus | | | |
| (B) | Catalyst Deactivation | 40 | 0.62 | 0.043 |
| (C) | Quinone Coupling | | | |
| | (1) Methanol precipitation | 40–50 | 0.55 | 0.090 |
| | (2) Steam precipitation | 95 | 0.55 | 0.250 |

EXAMPLE II

(A) Polymer Preparation

A 2.5 gallon stainless steel reactor equipped with an air-driven paddle stirrer, oxygen inlet tube, and water-cooled coil and jacket was charged with 5.48 l. toluene, 121.2 ml. of a stock catalyst solution, i.e. (29.5 ml. bromine added slowly to a chilled solution of 7.76 g. cuprous oxide and 132.0 g. 2,6-xylenol in methanol, then diluted to 1.0 l.), 4.51 g. N,N'-di(t-butyl)ethylenediamine (DBEDA), 26.5 g. N,N-dimethylbutylamine (DMBA), and 16.0 g. di(n-butyl)amine (DBA). Oxygen was bubbled into the resulting admixture at a rate of 10 SCFH while vigorously agitating the admixture, 1600 g. of 2,6-xylenol dissolved in 1.8 l. toluene was pumped into the reactor over a 30 minute period. Summarily, the reaction parameters relative to molar ratios of 2,6-xylenol:Cu:DBEDA:DMBA:Br:DBA were as follows: 1000:1:2:20:8:9.4. The reaction temperature was maintained at 25° C. throughout the monomer addition, and was increased to and maintained at 40° C. until the reaction was terminated.

(B) Catalyst Deactivation

The reaction was terminated after 58 minutes (measured from start of monomer addition) by replacing oxygen with nitrogen and the addition of 16.0 ml. 38% Na$_3$EDTA in water. Polymer analysis showed an [η] equal to 0.59 dl./g. and an OH absorbance of 0.042 units.

(C) Quinone Coupling

The resulting TMDQ containing reaction mixture was heated under nitrogen at 50° to 60° C. for 30 minutes and then at 95° C. for 15 minutes. At this point the mixture no longer exhibited the characteristic TMDQ color. Polymer analysis after methanol precipitation, washing and drying as described in Example I(C)(1) showed an [η] equal to 0.53 dl./g., and an OH absorbance of 0.139 units.

A summary of polymer processing and results are set out in Table II.

TABLE II

| | Process Step(s) | Reaction Temp. °C. | [η] dl./g. | OH Absorbance @ 2610 cm.$^{-1}$ |
|---|---|---|---|---|
| (A) | Polymer preparation, and | | | |
| (B) | Catalyst Deactivation | 25–40 | 0.59 | 0.042 |
| (C) | Quinone Coupling | 50–95 | 0.53 | 0.139 |

EXAMPLE III

The (A) Polymer Preparation and (B) Catalyst Reactivation processes of Example II, described above, were repeated.

(C) Quinone Coupling

The reaction temperature was 60° C. Polymer analysis showed an [η] equal to 0.55 dl./g., and an OH absorbance of 0.055 units.

A summary of polymer processing and results are set out in Table III.

TABLE III

| | Process Step | Reaction Temp. °C. | [η] dl./g. | OH Absorbance @ 2610 cm.$^{-1}$ |
|---|---|---|---|---|
| (A) | Polymer Preparation, plus | | | |
| (B) | Catalyst Deactivation | 40 | 0.60 | 0.017 |
| (C) | Quinone Coupling | 60 | 0.55 | 0.055 |

EXAMPLE IV

(A) Polymer Preparation

A reactor equipped as in Example II was charged with 4.0 l. toluene, 240 g. 2,6-xylenol, 24.0 g. di(n-butyl)amine, 64 g. 50% NaOH in 200 ml. methanol, and 900 ml. methanol. Oxygen was bubbled through the stirred mixture at 10 SCFH. After 5 minutes, a solution of 3.97 g. benzoin oxime and 1.10 g. manganese chloride in 100 ml. methanol was added. A solution containing 2.89 kg. 2,6-xylenol in 1.8 l. toluene was added at the rate of 96 ml./min. An additional 445 ml. toluene was added to wash in any residual reagents. The reaction temperature was maintained at 28° C.

(B) Catalyst Deactivation and Partial Quinone Coupling

After 90 minutes the oxygen flow was replaced with nitrogen, the temperature was raised to 40° C., an equal volume of water was added, and the aqueous phase was separated during a two-hour liquid-liquid centrifugation step.

(C) Additional Quinone Coupling

Partial quinone coupling occurred during the centrifugation step. The resulting polymer solution was further quinone reacted by heating at 60° C. for 15 minutes and then 90° C. for 10 minutes. The final reaction mixture was divided into two portions, one for isolation by the addition of two volumes of methanol, the other for isolation by steam precipitation. A summary of product analysis at the various stages of this Example is set out hereafter:

tion mixture rose to 45° C. and was maintained at 45° C. until after a total reaction time of 70 minutes, the polymer portion was precipitated with methanol containing 0.5% acetic acid, filtered and washed, dried in a circulating air oven at 80° C. Polymer analysis showed an intrinsic viscosity $[\eta]$ equal to 0.24 dl./g. and a TMDQ content less than 0.01% based on the weight of 2,6-xylenol. Summarily, the reaction parameters relative to molar ratios of 2,6-xylenol: Cu:DMBA:Br:DBA were as follows: 350:7:7:2:1. The resulting polymer was employed in a series of reactions described hereafter where TMDQ was added to the polymer on a controlled weight percent basis to evaluate the increases in hydroxyl—[OH] content as well as any changes in the intrinsic viscosity of the resulting quinone reacted polymer.

(C) Quinone Coupling

A series of reactions were carried out according to the procedure employed in Run No. 5 set out in Table V hereafter. The procedure employed in Run No. 5 was

TABLE IV

| | Process Step | Reaction Temp.°C. | Isolation | $[\eta]$ dl./g. | OH Absorbance @ 2610 cm.$^{-1}$ |
|---|---|---|---|---|---|
| (A) | Polymer Preparation | 28 | Methanol Ppt. | 0.65 | 0.036 |
| (B) | Catalyst Deactivation, plus Partial Quinone Coupling | 40 | Methanol Ppt. | 0.57 | 0.058 |
| (C) | Additional Quinone Coupling | 60 | Methanol Ppt. | 0.55 | 0.085 |
| | Additional Quinone Coupling | 90 | Methanol Ppt. | 0.53 | 0.106 |
| | Additional Quinone Coupling | 90 | Steam Ppt. | 0.52 | 0.163 |

EXAMPLE V

(A) Polymer Preparation, and (B) Catalyst Deactivation

A 2.5 gallon stainless steel reactor equipped with an air-driven paddle stirrer, oxygen inlet tube, and water-cooled coil and jacket was charged with 4.6 l. toluene, a catalyst premix composed of 6.28 g. of cupric chloride, 9.62 g. of sodium bromide, 6.84 g. of Aliquat® 336, 33.1 g. N,N-dimethylbutylamine (DMBA), and 42.3 g. di-n-butylamine (DBA). Oxygen was bubbled through the reaction medium at a rate of 10 SCFH with vigorous mixing of the reaction mixture. 2000 g. 2,6-xylenol in 2.4 l. of toluene was pumped into the reactor over a 30-minute period. The temperature of the reacas follows:

A solution of 10 g. of poly(2,6-dimethyl-1,4-phenylene oxide) having an intrinsic viscosity of 0.31 dl./g. dissolved in 80 ml. of toluene at 80° was charged with 3 g. 3,3′,5,5′-tetramethyl-4,4′-diphenoquinone (TMDQ) and stirred under positive nitrogen pressure. After 34 minutes the TMDQ had dissolved completely to form a clear orange colored solution. After a total reaction time of one hour the solution was cooled, 400 ml. methanol was added slowly with stirring to precipitate the polymer, the polymer was washed with methanol, and dried at 80° C. in a vacuum oven.

A summary of polymer processing and results is set out in Table V.

TABLE V

Summary of a Series of Reactions of Low Molecular Weight $[\eta]$ 0.31 dl./g. Poly(2,6-dimethyl-1,4-phenylene oxide)s With TMDQ

| Run No. | TMDQ (%)[1] | React. Temp. (°C.) | React. Time (min.) | Time for TMDQ to Dissolve (min.) | Yield (%)[1] | $[\eta]$ (dl./g.) | OH Absorbence at 3610 | GPC $\overline{M}_w/\overline{M}_n$ |
|---|---|---|---|---|---|---|---|---|
| 1 | 0 | 80 | 60 | n.a. | 98.9 | .31 | .22 | 2.0 |
| 2 | 0.5 | 80 | 30 | <5 | 98.8 | .32 | .27 | 3.9 |
| 3 | 1.0 | 80 | 30 | 10 | 99.3 | .28 | .33 | 2.8 |
| 4 | 1.5 | 80 | 60 | 30 | 101.0 | .31 | .36 | 2.1 |
| 5 | 3 | 80 | 60 | 34 | 99.4 | .32 | .48 | 2.3 |
| 6 | 6 | 80 | 60 | 2 | 98.5 | .35 | .60 | 2.6 |
| 7 | 12 | 80 | 60 | 2 | 102.5 | .34 | .57 | 2.6 |
| 8[3] | 12 | 80 | 60 | 2 | 103.7 | .33 | .51 | 2.6 |
| 9 | 12 | 80 | 15 | 2 | 104.9 | .35 | .67 | 2.2 |
| 10 | 12 | 80 | 30 | 2 | 104.9 | .30 | .48 | 2.4 |
| 11 | 12 | 80 | 120 | 2 | 99.3 | .31 | .40 | 2.7 |
| 12 | 1.5 | 80 | 2 | 2 | 98.8 | .34 | .37 | 2.6 |
| 13 | 1.5 | 80 | 5 | 2 | 98.8 | .31 | .31 | 2.3 |
| 14 | 1.5 | 80 | 15 | 2 | 99.5 | .29 | .35 | 3.7 |
| 15 | 1.5 | 80 | 30 | 30 | 99.0 | .31 | .36 | 3.9 |
| 16 | 1.5 | 80 | 120 | 30 | 99.4 | .31 | .37 | 4.1 |
| 17 | 1.5 | 50 | 30 | 2 | 98.2 | .35 | .22 | 2.1 |

TABLE V-continued

Summary of a Series of Reactions of Low Molecular Weight [η] 0.31 dl./g. Poly(2,6-dimethyl-1,4-phenylene oxide)s With TMDQ

| Run No. | TMDQ (%)[1] | React. Temp. (°C.) | React. Time (min.) | Time for TMDQ to Dissolve (min.) | Yield (%)[1] | [η] (dl./g.) | OH Absorbence at 3610 | GPC $\overline{M}_w/\overline{M}_n$ |
|---|---|---|---|---|---|---|---|---|
| 18 | 1.5 | 110 | 30 | <1 | 99.0 | .30 | .40 | 2.8 |
| 19 | 3 | 50 | 60 | 2 | 98.2 | .35 | .23 | 2.1 |
| 20 | 3 | 110 | 60 | <10 | 99.4 | .27 | .43 | 2.2 |
| 21 | 12 | 50 | 60 | 2 | 106.5 | .31 | .27 | 1.8 |
| 22 | 12 | 110 | 60 | 50 | 94.0 | .25 | 1.0 | 3.0 |

[1] = Based on weight of initial PPO.
[2] = Not completely dissolved at end of reaction period.
[3] = Benzene was the solvent.
n.a. = Nonapplicable.

EXAMPLE VI (A) Polymer Preparation and (B) Catalyst Deactivation

A series of poly(2,6-dimethyl-1,4-phenylene oxide)s were polymerized by procedures similar to those described in Examples I, II and V and were separated by methanol precipitation, washed with methanol and dried in a circulating oven at 80° C. The resulting polymers were employed in a series of reactions described hereafter where TMDQ was added to the various polymers on a controlled weight percent basis to evaluate the increases in the hydroxyl content as well as any changes in the intrinsic viscosities of the resulting quinone reacted polymer.

(C) Quinone Coupling

A series of reactions were carried out according to the general procedure described by Run No. 5 in Example V above.

A summary of the polymer processing and results is set out in Example VI.

TABLE VI

Summary of a Series of Reactions of High Molecular Weight [η] 0.44 to 1.0 dl./g. Poly(2,6-dimethyl-1,4-phenylene oxide)s With TMDQ

| Run No.[1] | TMDQ (%) | React. Time (min.) | React. Temp. (°C.) | Yield (%)[3] | [η] (dl./g.) Initial | [η] (dl./g.) Final | OH 3610 cm.$^{-1}$ Absorbance Initial | OH 3610 cm.$^{-1}$ Absorbance Final |
|---|---|---|---|---|---|---|---|---|
| 1[3] | 1.5 | 60 | 80 | 101 | .44 | .41 | .12 | .30 |
| 2[3] | 3 | 60 | 80 | 101 | .44 | .38 | .12 | .40 |
| 3[3] | 6 | 60 | 80 | 97 | .44 | .44 | .12 | .47 |
| 4[4] | 3 | 120 | 80 | 98 | .50 | .38 | .03 | .28 |
| 5[4] | 3 | 120 | 130 | 97 | .50 | .38 | .03 | .28 |
| 6[5] | 3 | 120 | 80 | 99β | .60 | .49 | .08 | .25 |
| 7[5] | 3 | 120 | 80 | 99 | 1.00 | .89 | .03 | .22 |

[1] = Solvent was toluene in Run Nos. 1-5, 7 and 8. Solvent was chlorobenzene in Run No. 6.
[2] = Yield was based on initial weight of polymer = 100%.
[3] = Polymer prepared by a procedure similar to one as set out in Example V.
[4] = Polymer prepared by a procedure similar to one as set out in Example I except with diethylamine instead of dibutylamine.
[5] = Polymer prepared by a procedure similar to one as set out in Example II except for the omission of the dibutylamine.

EXAMPLE VII (A) Polymer Preparation and (B) Catalyst Deactivation

A series of poly(2,6-dimethyl-1,4-phenylene oxide)s were polymerized as described in Example V and were separated by methanol precipitation, washed with methanol and dried in a circulating oven at 80° C. The resulting polymers were employed in a series of quinone coupling reactions described hereafter where TMDQ and basic as well as acetic additives were added to the various polymers on a controlled weight percent basis to evaluate the increases in the hydroxyl content as well as any changes in the intrinsic viscosities of the resulting quinone reacted polymer.

(C) Quinone Coupling

A series of reactions were carried out according to the general procedure described by Run No. 5 in Example V above.

A summary of the polymer processing and results is set out in Example VII hereafter.

TABLE VII

Summary of a Series of Reactions at 80° C. of Low Molecular Weight Poly(2,6-dimethyl-1,4-phenylene oxide) in the Presence of Basic and Acidic Additives

| Sample No. | Additive | Quantity of Additive[a] (%) | TMDQ (%)[a] | React. Time (min) | Time for TMDQ to Dissolve (min) | Yield (%)[a] | [η] dl/g | OH Absorbance at 3610 | GPC $\overline{M}_w/\overline{M}_n$ | Nitrogen (ppm) |
|---|---|---|---|---|---|---|---|---|---|---|
| 1 | None | 0 | 0 | 60 | — | 98.9 | .31 | .22 | 2.0 | 530 |
| 2 | " | 0 | 1 | 30 | 10 | 99.3 | .28 | .33 | 2.8 | 534 |
| 3 | Dibutylamine | .3 | 1 | 30 | 15 | 95.8 | .28 | .33 | 1.6 | 745 |
| 4 | " | 5 | 1 | 30 | 10 | 96.6 | .29 | .34 | 1.5 | 797 |
| 5 | " | 10 | 1 | 30 | 8 | 96.0 | .29 | .34 | 1.7 | 800 |
| 6 | " | 1 | 1.5 | 30 | <10 | 100.0 | .20 | .38 | 3.3 | 1140 |
| 7 | " | 5 | 1.5 | 30 | <10 | 100.4 | .22 | .40 | 4.4 | 1041 |
| 8 | " | 10 | 1.5 | 30 | 17 | 96.2 | .26 | .38 | 1.6 | 994 |

TABLE VII-continued
Summary of a Series of Reactions at 80° C. of Low Molecular Weight Poly(2,6-dimethyl-1,4-phenylene oxide) in the Presence of Basic and Acidic Additives

| Sample No. | Additive | Quantity of Additive[a] (%) | TMDQ (%)[a] | React. Time (min) | Time for TMDQ to Dissolve (min) | Yield (%)[a] | $[\eta]$ dl/g | OH Absorbance at 3610 | GPC $\overline{M}_w/\overline{M}_n$ | Nitrogen (ppm) |
|---|---|---|---|---|---|---|---|---|---|---|
| 9  | "                    | 5  | 2   | 30 | 20   | 94.4  | .22 | .41 | 1.6 | 1130 |
| 10 | "                    | 10 | 2   | 60 | 10   | 100.4 | .23 | .45 | 1.8 | 984  |
| 11 | "                    | 10 | 30  | 60 | 20   | 100.8 | .19 | .54 | 1.7 | 1150 |
| 12 | Butyldimethylamine   | 5  | 1.5 | 30 | <10  | 99.8  | .26 | .38 | 4.2 | 648  |
| 13 | "                    | 10 | 1.5 | 30 | 15   | 96.2  | .26 | .39 | 1.8 | 645  |
| 14 | "                    | 5  | 3   | 30 | 15   | 92.6  | .30 | .44 | 2.3 | 599  |
| 15 | "                    | 10 | 3   | 60 | 30   | 100.7 | .21 | .56 | 2.1 | 859  |
| 16 | Acetic acid          | 10 | 3   | 60 | 30   | 98.9  | .19 | .62 | 1.7 | c    |
| 17 | Sulfuric acid        | 10 | 3   | 60 | <1   | 98.6  | .32 | .25 | 2.0 | c    |
| 18 | 50% aq. NaOH         | 4  | 3   | 60 | b    | 98.9  | .30 | .34 | 2.9 | c    |

[a] Based on weight of initial PPO.
[b] A green precipitate forms which does not dissolve completely during the reaction period.
[c] Not determined.

As illustrated by the foregoing examples, quinones can be reacted effectively with polyphenylene oxides to form novel quinone-coupled polyphenylene oxide having an average hydroxyl group values greater than the average hydroxyl group value associated with the polyphenylene oxide reactant. Analogous results are obtained wherein any prior art polyphenylene oxide is employed in the preparation of quinone-coupled polyphenylene oxides which can contain quinone species of the general formula:

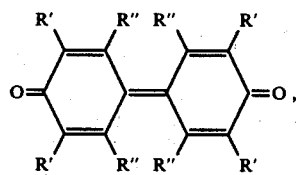

wherein R' and R" are as defined hereinbefore, which are other than those employed in the Examples such as TMDQ.

Other modifications and variations of the present invention are possible in light of the above teachings.

I claim:

1. A quinone-coupled polyphenylene oxide of the formula

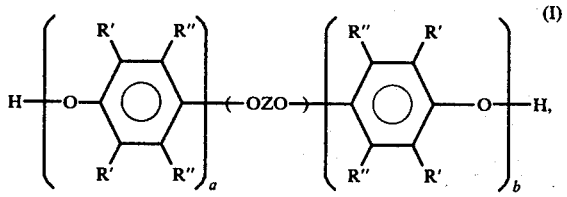

wherein independently each ‐OZO‐ is a divalent quinone residue, Z is a divalent arene radical, either a or b is at least equal to 1 and the sum of a plus b is at least equal to 10, R' is hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus, R" being the same as R' and, in addition, halogen.

2. A claim 1 compound, wherein ‐OZO‐ is of the formula

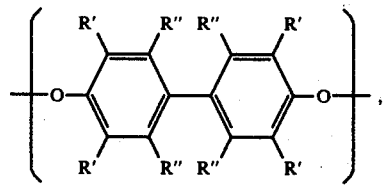

wherein R' and R" are as defined hereinbefore.

3. A claim 2 compound, wherein each R' is a methyl radical and R" is hydrogen.

4. A claim 3 compound, wherein the sum of a plus b is at least equal to 40 to 500.

5. A claim 4 compound, wherein the sum of a plus b is equal to 40 to 170.

6. A claim 2 compound, wherein each R' is hydrogen, a hydrocarbon radical, or a halohydrocarbon radical and R" is hydrogen.

7. A claim 6 compound, wherein the sum of a plus b is at least equal to 40 to 500.

8. A claim 7 compound, wherein the sum of a plus b is equal to 40 to 170.

* * * * *